US011222470B1

(12) United States Patent
Wilczynski et al.

(10) Patent No.: US 11,222,470 B1
(45) Date of Patent: Jan. 11, 2022

(54) SYSTEMS AND METHODS FOR GENERATING AUGMENTED REALITY CONTENT

(71) Applicant: Palantir Technologies Inc., Palo Alto, CA (US)

(72) Inventors: Peter Wilczynski, San Francisco, CA (US); Daniel Cervelli, Mountain View, CA (US); Andrew Elder, New York, NY (US); Anand Gupta, Washington, DC (US); Praveen Kumar Ramalingam, Washington, DC (US); Robert Imig, Austin, TX (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/129,513

(22) Filed: Sep. 12, 2018

Related U.S. Application Data

(60) Provisional application No. 62/720,733, filed on Aug. 21, 2018.

(51) Int. Cl.
  *G06T 19/00* (2011.01)
  *H04N 21/2187* (2011.01)
  *H04N 21/235* (2011.01)

(52) U.S. Cl.
  CPC ....... *G06T 19/006* (2013.01); *H04N 21/2187* (2013.01); *H04N 21/2353* (2013.01)

(58) Field of Classification Search
  None
  See application file for complete search history.

(56) References Cited

U.S. PATENT DOCUMENTS

| | | | |
|---|---|---|---|
| 7,133,771 B1 | 11/2006 | Nesbitt | |
| 7,881,861 B2 | 2/2011 | Kravets et al. | |
| 8,108,141 B2 | 1/2012 | Ehrlacher | |
| 8,463,537 B2 | 6/2013 | Mueller et al. | |
| 9,360,335 B1 | 6/2016 | Powelson et al. | |
| 9,547,986 B1 | 1/2017 | Curlander et al. | |
| 9,600,146 B2 | 3/2017 | Cervelli et al. | |
| 9,784,589 B1 | 10/2017 | Gyenes et al. | |

(Continued)

OTHER PUBLICATIONS

Koeda et al. (Annotation-Based Assistance System for Unmanned Helicopter with Wearable Augmented Reality Environment, IEEE 2014) (Year: 2004).*

(Continued)

*Primary Examiner* — Kyle Zhai
(74) *Attorney, Agent, or Firm* — Sheppard Mullin Richter & Hampton LLP

(57) ABSTRACT

In some embodiments, a method comprises obtaining a video stream of a portion of a geographic area, the video stream comprising a plurality of video frames, each of the plurality of video frames captured at a respective first time. Contextual metadata is obtained, the contextual metadata associated with one or more objects located in the portion of the geographic area at a second time, the second time being before each of the respective first times. The contextual metadata is inserted into one or more of the plurality of video frames, thereby causing the contextual metadata associated with the one or more objects to be overlaid on one or more corresponding portions of the one or more of the plurality of video frames.

18 Claims, 7 Drawing Sheets

(56) References Cited

U.S. PATENT DOCUMENTS

| | | |
|---|---|---|
| 9,996,229 B2 | 6/2018 | Erenrich et al. |
| 10,133,995 B1 | 11/2018 | Reiss et al. |
| 2002/0039108 A1 | 4/2002 | Roy et al. |
| 2006/0015499 A1 | 1/2006 | Clissold et al. |
| 2006/0184314 A1 | 8/2006 | Couckuyt et al. |
| 2007/0168118 A1 | 7/2007 | Lappe et al. |
| 2007/0293958 A1 | 12/2007 | Stehle et al. |
| 2009/0303251 A1 | 12/2009 | Balogh et al. |
| 2010/0036599 A1 | 2/2010 | Froeberg et al. |
| 2010/0217784 A1 | 8/2010 | Carter et al. |
| 2010/0253541 A1* | 10/2010 | Seder .................. G08G 1/165 340/905 |
| 2011/0106429 A1 | 5/2011 | Poppen et al. |
| 2012/0123678 A1 | 5/2012 | Poppen et al. |
| 2012/0123806 A1 | 5/2012 | Schumann et al. |
| 2012/0136689 A1 | 5/2012 | Ickman et al. |
| 2012/0253661 A1 | 10/2012 | Tuukkanen |
| 2013/0132389 A1 | 5/2013 | Majidian |
| 2013/0298083 A1* | 11/2013 | Bertoldo ............... G06F 3/0482 715/835 |
| 2014/0005941 A1 | 1/2014 | Paek et al. |
| 2014/0036090 A1* | 2/2014 | Black ................ H04N 21/4788 348/159 |
| 2014/0108419 A1 | 4/2014 | Udeshi et al. |
| 2014/0210839 A1 | 7/2014 | Castelli et al. |
| 2014/0267723 A1* | 9/2014 | Davidson, Jr. ......... H04N 7/183 348/147 |
| 2014/0282093 A1 | 9/2014 | Burke et al. |
| 2014/0333651 A1 | 11/2014 | Cervelli et al. |
| 2014/0372498 A1 | 12/2014 | Mian et al. |
| 2015/0032366 A1 | 1/2015 | Man et al. |
| 2015/0177964 A1 | 6/2015 | Spirer |
| 2015/0281250 A1 | 10/2015 | Miller et al. |
| 2015/0338852 A1 | 11/2015 | Ramanujam et al. |
| 2015/0339928 A1 | 11/2015 | Ramanujam et al. |
| 2016/0069694 A1 | 3/2016 | Tao et al. |
| 2016/0109251 A1 | 4/2016 | Thakur |
| 2016/0109252 A1 | 4/2016 | Caine et al. |
| 2016/0142964 A1 | 5/2016 | Todasco et al. |
| 2016/0203422 A1 | 7/2016 | Demarchi et al. |
| 2016/0229404 A1 | 8/2016 | Byun et al. |
| 2016/0273930 A1 | 9/2016 | Wada et al. |
| 2016/0298974 A1 | 10/2016 | Newlin et al. |
| 2016/0298977 A1 | 10/2016 | Newlin et al. |
| 2016/0334233 A1 | 11/2016 | Baverstock |
| 2016/0379486 A1 | 12/2016 | Taylor |
| 2017/0052654 A1 | 2/2017 | Cervelli et al. |
| 2017/0052655 A1 | 2/2017 | Cervelli et al. |
| 2017/0084037 A1* | 3/2017 | Barajas Hernandez ..................... G06K 9/4671 |
| 2017/0167882 A1 | 6/2017 | Ulloa Paredes et al. |
| 2017/0169373 A1 | 6/2017 | Roulland et al. |
| 2017/0192437 A1 | 7/2017 | Bier et al. |
| 2017/0262790 A1 | 9/2017 | Khasis |
| 2017/0263092 A1* | 9/2017 | Rankin .................. G08B 13/22 |
| 2017/0268891 A1 | 9/2017 | Dyrnaes et al. |
| 2017/0276507 A1 | 9/2017 | Zacharenko |
| 2017/0300049 A1 | 10/2017 | Seally |
| 2017/0314948 A1 | 11/2017 | Racah et al. |
| 2017/0314949 A1 | 11/2017 | Rovik et al. |
| 2017/0329569 A1 | 11/2017 | Wilczynski et al. |
| 2017/0337813 A1 | 11/2017 | Taylor |
| 2018/0143027 A1 | 5/2018 | Schlesinger et al. |
| 2018/0143649 A1 | 5/2018 | Miao et al. |
| 2018/0211541 A1 | 7/2018 | Rakah et al. |
| 2018/0211546 A1 | 7/2018 | Smartt et al. |
| 2018/0259976 A1 | 9/2018 | Williams et al. |
| 2019/0197787 A1* | 6/2019 | Easter ................... G06T 19/006 |
| 2019/0206130 A1* | 7/2019 | Ericson ................... G06K 9/18 |

OTHER PUBLICATIONS

Official Communication for U.S. Appl. No. 15/348,860 dated Dec. 15, 2017.

Official Communication for U.S. Appl. No. 15/666,368 dated Nov. 16, 2017.

Official Communication for U.S. Appl. No. 15/676,509 dated Nov. 16, 2017.

Official Communication for U.S. Appl. No. 15/666,368 dated Feb. 22, 2018.

Official Communication for U.S. Appl. No. 15/676,509 dated Sep. 7, 2018.

Official Communication for U.S. Appl. No. 15/676,509 dated Jan. 11, 2019.

Official Communication for U.S. Appl. No. 15/676,509 dated Feb. 26, 2018.

Official Communication for U.S. Appl. No. 15/826,446 dated Dec. 10, 2018.

Official Communication for U.S. Appl. No. 15/826,446 dated Jan. 22, 2018.

Official Communication for U.S. Appl. No. 15/826,446 dated Aug. 10, 2018.

\* cited by examiner

SYSTEMS AND METHODS FOR GENERATING AUGMENTED REALITY CONTENT

CROSS REFERENCE TO RELATED APPLICATIONS

This application claims the benefit under 35 U.S.C. § 119(e) of U.S. Provisional Application Ser. No. 62/720,733 filed Aug. 21, 2018, the content of which is incorporated by reference in its entirety into the present disclosure.

TECHNICAL FIELD

This disclosure pertains to systems and methods for generating augmented reality content.

BACKGROUND

Under some approaches, drones and/or other aerial vehicles may capture video images of a geographic area. However, the captured video images may be blurry, have poor resolution, and/or be obscured by cloud cover. Accordingly, users and/or associated computing systems may be unable to discern various landmarks and/or other features of the geographic area in the video images.

SUMMARY

A claimed solution rooted in computer technology overcomes problems specifically arising in the realm of computer technology. In various implementations, a computing system is configured to obtain a video stream of a portion of a geographic area. For example, the portion of the geographic area may include one or more objects (e.g., streets, building structures, terrain features, persons, and/or other features within the geographic area). The video stream may comprise a plurality of video frames, and each of the plurality of video frames may be captured at a respective first time (e.g., 05:30:01 AM on Jan. 1, 2018, 05:30:02 AM on Jan. 1, 2018). The computing system may obtain contextual metadata. For example, contextual metadata may comprise, and/or be based on, historical information stored locally and/or in a remote datastore. The contextual metadata may be associated with one or more objects located in the portion of the geographic area at a second time (e.g., 14:45:05 on Dec. 20, 2017) before the respective first times. The computing system may insert the contextual metadata into one or more of the plurality of video frames, thereby causing the contextual metadata associated with the one or more objects to be overlaid on one or more corresponding portions of the one or more of the plurality of video frames. For example, a name and/or other information of a building structure may be overlaid on the building structure in the video frame. This may help provide users with contextual information while a user views the video, and/or help users and/or systems identify features in the video that would otherwise not be identifiable (e.g., due to cloud cover).

In some embodiments, the contextual metadata is identified based on one or more field-of-views (FOVs) of one or more cameras associated with the video stream. For example, the computing system may determine a multidimensional (e.g., two-dimensional, three-dimensional) "bounding box" representing a FOV of a camera capturing the video stream. The bounding box may be defined based on coordinates (e.g., map coordinates, GPS coordinates). The computing system and/or associated system(s) may identify contextual metadata for objects within the bounding box. For example, another video stream of the same area may have been previously captured, labeled (i.e., the contextual metadata), and stored. The computing system may use the previous contextual metadata to provide information associated with the current video stream, such as by overlaying the previous contextual metadata on the current video stream.

In some embodiments, the contextual metadata is inserted into the one or more of the plurality of video frames in response to a user viewing the one or more of the plurality of video frames. In some embodiments, the video stream comprises a live video stream.

In some embodiments, the video stream is obtained in response to a user zooming in on a geographic map representing at least the portion of the geographic area. In related embodiments, the video stream is overlaid on a portion of the geographic map.

Various embodiments of the present disclosure include systems, methods, and non-transitory computer readable media configured to obtain a video stream of a portion of a geographic area, the video stream comprising a plurality of video frames, each of the plurality of video frames captured at a respective first time. Contextual metadata is obtained, the contextual metadata associated with one or more objects located in the portion of the geographic area at a second time, the second time being before each of the respective first times. The contextual metadata is inserted into one or more of the plurality of video frames, thereby causing the contextual metadata associated with the one or more objects to be overlaid on one or more corresponding portions of the one or more of the plurality of video frames.

In some embodiments, the contextual metadata is obtained based on a field-of-view (FOV) of a camera associated with the video stream.

In some embodiments, the one or more objects comprise one or more building structures, and the contextual metadata comprises information associated with the one or more building structures.

In some embodiments, the contextual metadata is inserted into the one or more of the plurality of video frames in response to a user viewing the one or more of the plurality of video frames.

In some embodiments, the video stream comprises a live video stream.

In some embodiments, the video stream is obtained in response to a user zooming in on a geographic map representing at least the portion of the geographic area. In related embodiments, the video stream is overlaid on a portion of the geographic map.

In some embodiments, the systems, methods, and non-transitory computer readable media further configured to perform identifying geographic coordinates defining a boundary of the FOV of the camera associated with the video stream; generating a query comprising the geographic coordinates defining the boundary of the FOV of the camera associated with the video stream; and receiving a response to the query, the query response based on the geographic coordinates defining a boundary of the FOV, the contextual metadata being based on the query response. In related embodiments, the query further comprises one or more of the respective first times, and the query response is based on the one or more of the respective first times.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Figure 1:
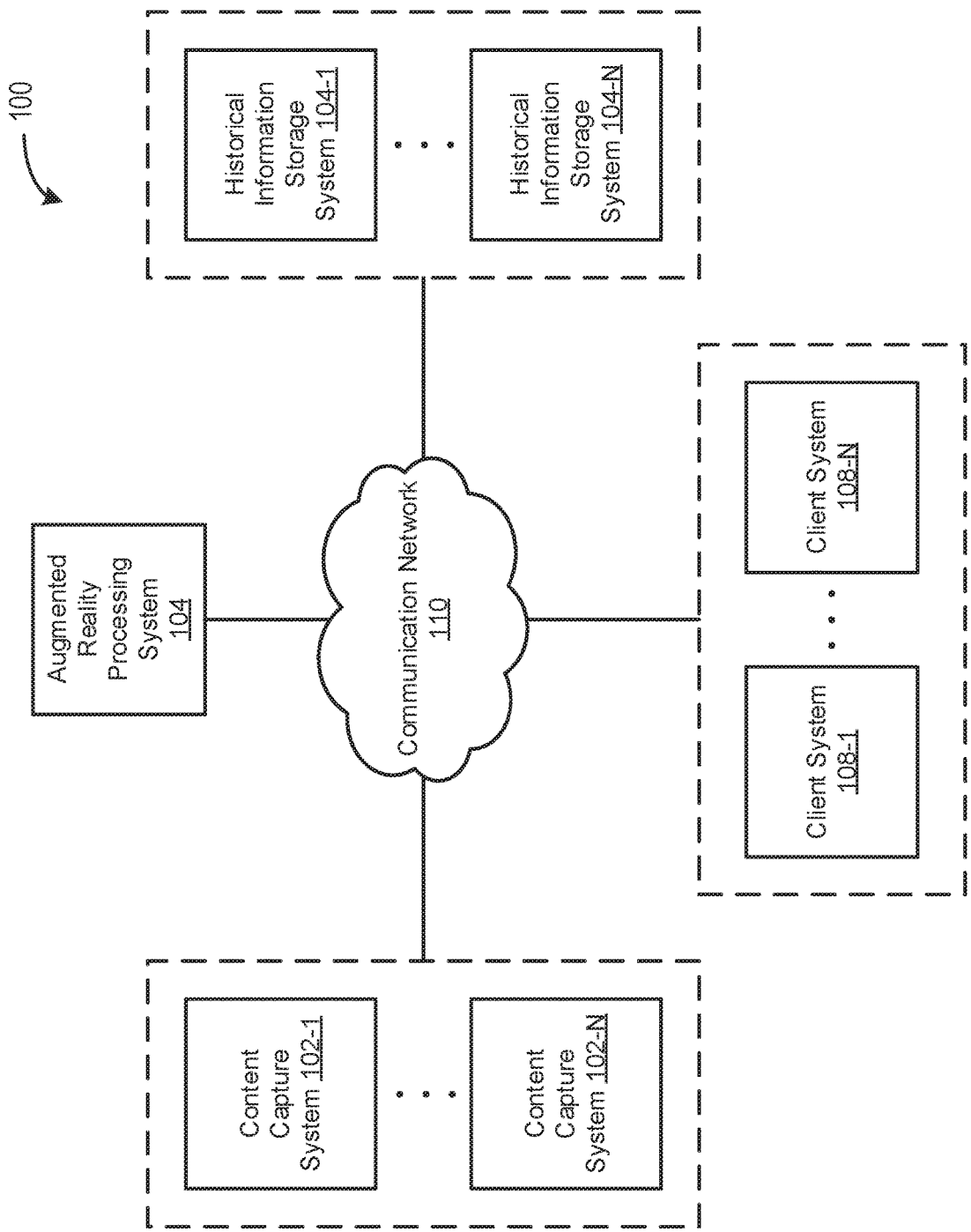
FIG. 1 depicts a diagram of an example system for generating augmented reality video according to some embodiments.

A claimed solution rooted in computer technology overcomes problems specifically arising in the realm of computer technology. In various implementations, a computing system is configured to obtain a video stream of a portion of a geographic area. For example, the portion of the geographic area may include one or more objects (e.g., streets, building structures, terrain features, persons, and/or other features within the geographic area). The video stream may comprise a plurality of video frames, and each of the plurality of video frames may be captured at a respective first time (e.g., 05:30:01 AM on Jan. 1, 2018, 05:30:02 AM on Jan. 1, 2018). The computing system may obtain contextual metadata. For example, contextual metadata may comprise, and/or be based on, historical information stored locally and/or in a remote datastore. The contextual metadata may be associated with one or more objects located in the portion of the geographic area at a second time (e.g., 14:45:05 on Dec. 20, 2017) before the respective first times. The computing system may insert the contextual metadata into one or more of the plurality of video frames, thereby causing the contextual metadata associated with the one or more objects to be overlaid on one or more corresponding portions of the one or more of the plurality of video frames. For example, a name and/or other information of a building structure may be overlaid on the building structure in the video frame. This may help provide users with contextual information while a user views the video, and/or help users and/or systems identify features in the video that would otherwise not be identifiable (e.g., due to cloud cover, smoke, blurry images, low resolution images).

In some embodiments, contextual metadata is identified based on one or more field-of-views (FOVs) of one or more cameras associated with the video stream. For example, the computing system may determine a multi-dimensional (e.g., two-dimensional, three-dimensional) "bounding box" representing a FOV of a camera capturing the video. The bounding box may be defined based on geographical coordinates (e.g., map coordinates, GPS coordinates). The computing system and/or associated system(s) may identify contextual metadata for objects within the bounding box. For example, another video stream covering of same and/or overlapping geographical area may have been previously captured, labeled (i.e., the contextual metadata), and stored. The computing system may use the previous contextual metadata to provide information associated with the current video stream, such as by overlaying the previous contextual metadata on the current video stream.

In some embodiments, contextual metadata is inserted into the one or more of the plurality of video frames in response to a user viewing the one or more of the plurality of video frames. In some embodiments, the video stream comprises a live video stream. In some embodiments, the video stream is obtained in response to a user zooming in on a geographic map representing at least the portion of the geographic area.

FIG. 1 depicts a diagram 100 of an example system for generating augmented reality content according to some embodiments. In the example of FIG. 1, the system includes content capture systems 102-1 to 102-N (individually, the content capture system 102, collectively, the content capture systems 102), historical information storage systems 104-1 to 104-N (individually, the historical information storage system 104, collectively, the historical information storage systems 104), an augmented reality processing system 106, client systems 108-1 to 108-N (individually, the client system 108, collectively, the client systems 108), and a communication network 110.

The content capture systems 102 may each function to capture raw content of a geographic area. A geographic area may include one or more objects (e.g., streets, building structures, terrain features, persons, and/or other features within a geographic area). Raw content may include video, still images, pictures, audio, and/or the like. Raw content may include pre-recorded content and/or live content. For example, raw content may include a live video stream, a pre-recorded video stream, and/or the like. In some embodiments, raw content may comprise a video stream including one or more segments (or, "chunks"). Each segment may include one or more frames. In various embodiments, functionality of a content capture system 102 may be performed by one or more content capture devices (e.g., one or cameras and/or microphones), measurement devices (e.g., for measuring an aperture or angle of a camera, measuring an elevations and/or a distance from a camera to a target, logging a date/time that content is captured), and/or the like.

In some embodiments, a content capture system 102 may comprise a portion of, or be coupled to, one or more vehicles (e.g., an aerial vehicle) and/or other devices (e.g., smart-glasses, smartphones). For example, a content capture system 102 may comprise a portion of an unmanned aerial vehicle (or, "UAV" or "drone") and/or be coupled to a UAV.

In some embodiments, a content capture system 102 may function to capture raw content within a field-of-view (FOV) of one or more content capture devices. The content capture system 102 may function to capture additional information, such as measurement information. For example, the content capture system 102 may capture time information (e.g., timestamps including dates and/or times that content is recorded), elevation information (e.g., height of the camera off of the ground), speed (e.g., a speed of the associated UAV), temperature information (e.g., an ambient temperature), and/or the like), aperture information and/or other camera information, and/or the like.

In some embodiments, the content capture systems 102 may each function to store and/or transmit content. For example, a content capture system 102 may capture live video of a geographic area. The content capture system 102 may store the live video locally and/or remotely (e.g., in a remote datastore). The content capture system 102 may transmit content in real-time (e.g., via a live stream), and/or otherwise (e.g., recorded/stored content via stream and/or broadcast).

In some embodiments, raw data from the content capture systems 102 may be processed after collection in order to improve accuracy and reduce error. For example, a content capture system may perform crude, fast two-dimensional georectification based on simple heuristics (e.g., current location and aperture angle) during live collection and post-process the same data with more accurate elevation data to produce more complex three-dimensional models in preparation for long-term storage.

The historical information storage systems 104 may each function to store historical information. Historical information may include previously captured raw content and/or other previously recorded information (e.g., contextual metadata). Contextual metadata may include labels, markers, and/or other information that may be associated with content. For example, contextual metadata may include names or other identifiers of objects within the content. In some embodiments, contextual metadata may be automatically generated (e.g., without requiring user input) and/or manually generated.

In some embodiments, historical information storage systems 104 may function to store augmented reality content. Augmented reality content may be generated from, and/or may comprise, raw content and contextual metadata. As used herein, the term "content" may refer to raw content and/or augmented reality content. Augmented reality content may include contextual metadata embedded within one or more portions of the augmented reality content (e.g., within individual frames of a video) and/or stored separately. Separately stored contextual metadata may be referenced using pointers and/or the like. In various embodiments, functionality of the historical information storage systems 104 may be performed by one or more datastores, servers (e.g., a cloud-based server) and/or other computing devices.

In some embodiments, the historical information storage systems 104 may each function to receive and/or process search queries (or, simply, "queries"). For example, the historical information storage systems 104 may receive a query for content and/or contextual metadata. Queries may include one or more query attributes that may be used to search historical information. Query attributes may include geographic information, such as geographic coordinates (e.g., latitude, longitude), global positioning satellite (GPS) coordinates, and the like. For example, a query may include geographic coordinates corresponding to a FOV of a content capture device of a content capture system 102. Accordingly, the query results may correspond to previously captured content and/or contextual metadata associated with some or all of a geographic area corresponding to the geographic coordinates of the query.

The augmented reality processing system 106 may function to generate and/or perform queries. The augmented reality processing system 106 may automatically generate a query based on raw content. For example, the augmented reality processing system 106 may generate a query comprising the geographic coordinates bounding at least a portion of one or more frames of raw content.

The augmented reality processing system 106 may function to obtain contextual metadata. The obtained contextual metadata may be associated with one or more objects positioned within a portion of a geographic area. For example, the augmented reality processing system 106 may generate a query based on geographic coordinates of a portion of the geographic area (e.g., the portion captured in one or more segments and/or frame of a video). The query may be executed and/or processed (e.g., by the augmented reality processing system 106 and/or historical information system 104), and query results may be returned in response to the query.

The augmented reality processing system 106 may function to generate augmented reality content. In some embodiments, the augmented reality processing system 106 inserts contextual metadata into one or more segments and/or frames of raw content, thereby causing the contextual metadata associated with one or more objects to be overlaid on one or more corresponding portions of the segment(s) and/or frame(s). For example, a name, street address, a threat level and/or other information of a building structure may be overlaid on the building structure in one or more video frames. This may help provide users with contextual information while a user views the video, and/or help users and/or systems identify features in the video that would otherwise not be identifiable (e.g., due to cloud cover, blurry images, low resolution images).

The augmented reality processing system 106 may function to generate and/or present graphical user interfaces (GUIs) and/or other information. In some embodiments, the augmented reality processing system 106 may cooperate with one or more other systems (e.g., client systems 108) to generate and/or present GUIs and/or other information. For example, the augmented reality processing system 106 may provide server-side functionality, while the one or more other systems provide client-side functionality (e.g., a web browser and/or other client-side application).

The client systems 108 may function to present content and/or interact with content. For example, a client system may display one or more GUIs including augmented reality content. In some embodiments, functionality of the client systems 106 may be performed by one or desktop computers, laptop computers, mobiles devices, servers and/or other computing devices.

The communications network 110 may represent one or more computer networks (e.g., LAN, WAN, or the like) or other transmission mediums. The communication network 110 may provide communication between systems 102-108 and/or other systems described herein. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
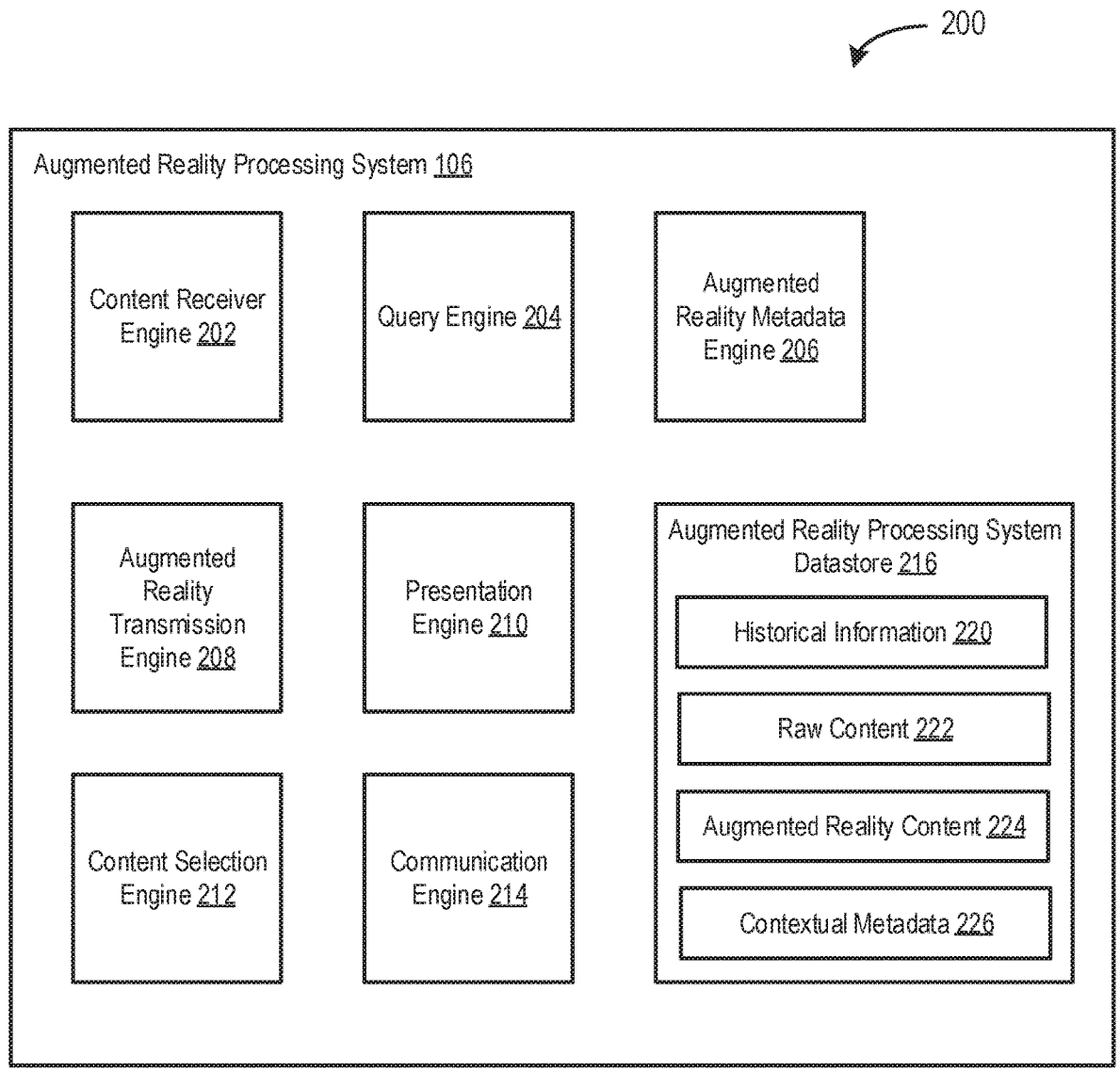
FIG. 2 depicts a diagram of an example of an augmented reality processing system according to some embodiments.

FIG. 2 depicts a diagram 200 of an example of an augmented reality processing system 106 according to some embodiments. In the example of FIG. 2, the augmented reality processing system 106 includes a content receiver engine 202, a query engine 204, an augmented reality metadata engine 206, an augmented reality transmission engine 208, a presentation engine 210, a content selection engine 212, a communication engine 214, and an augmented reality processing system datastore 216.

The content receiver engine 202 may function to receive and/or otherwise obtain content. The content receiver engine 202 may obtain raw content 222 and/or augmented reality content 224. The content receiver engine 202 may cooperate with the communication engine 214 to obtain the content over a communication network and/or store content in a datastore (e.g., augmented reality processing system datastore 216).

The query engine 204 may function to generate queries (e.g., search queries). The augmented reality processing system 106 and/or other systems may execute the queries. The queries may be used to search one or more datastores for historical information 220 matching, and/or at least partially matching, the queries. Historical information 220 may be obtained in response to one or more queries (e.g., obtained from historical information storage system 104). Accordingly, query responses may include raw content 222, augmented reality content, contextual metadata 226, and/or the like.

In some embodiments, the query engine 204 may generate a query based on one or more geographic coordinates and/or sets of geographic coordinates. The geographic coordinates may define a boundary of a FOV of a content capture device associated with content. This may allow, for example, the query engine 204 to generate a query searching for historical information 220 at least partially matching a particular geographic area (e.g., an area within a view of a particular drone).

The augmented reality metadata engine 206 may function to receive and/or otherwise obtain contextual metadata 226. In some embodiments, the augmented reality metadata engine 206 comprises one or more application programming interfaces (APIs) for cooperating with one or more remote systems storing contextual metadata. For example, the APIs may allow the augmented reality metadata engine 206 to retrieve contextual metadata 226 over a communication network from a third-party storage system.

The augmented reality metadata engine 206 may function to generate contextual metadata 226. The augmented reality metadata engine 206 may generate the contextual metadata 226 from historical information 220. For example, the historical information 220 may include annotations and/or other information regarding a particular object in a particular geographic area. The augmented reality metadata engine 206 may convert those annotations and/or other information into contextual metadata 226.

The augmented reality metadata engine 206 may function to generate augmented reality content 224. For example, the augmented reality metadata engine 206 may generate augmented reality content 224 by inserting/embedding contextual metadata 226 into content (e.g., within one or more frames of video). In another example, contextual metadata 226 may be referenced in the content (e.g., via pointers). In some embodiments, the contextual metadata 226 may be included as one or more layers within the content. For example, a first layer may be embedded into the content such that playback of the resulting augmented reality content 224 may render the underlying raw content (e.g., a video stream), a first layer over the raw content, a second layer over the first layer and/or the raw content, and so forth.

The augmented reality transmission engine 208 may function to transmit, and/or otherwise provide, content. For example, the augmented reality transmission engine 208 may transmit augmented reality content 224. The augmented reality transmission engine 208 may provide content in real-time and/or otherwise (e.g., in batches). For example, the augmented reality transmission engine 208 may stream augmented reality content 224 to a client system as the augmented reality content 224 is being generated (e.g., on a segment-by-segment basis).

Figure 4:
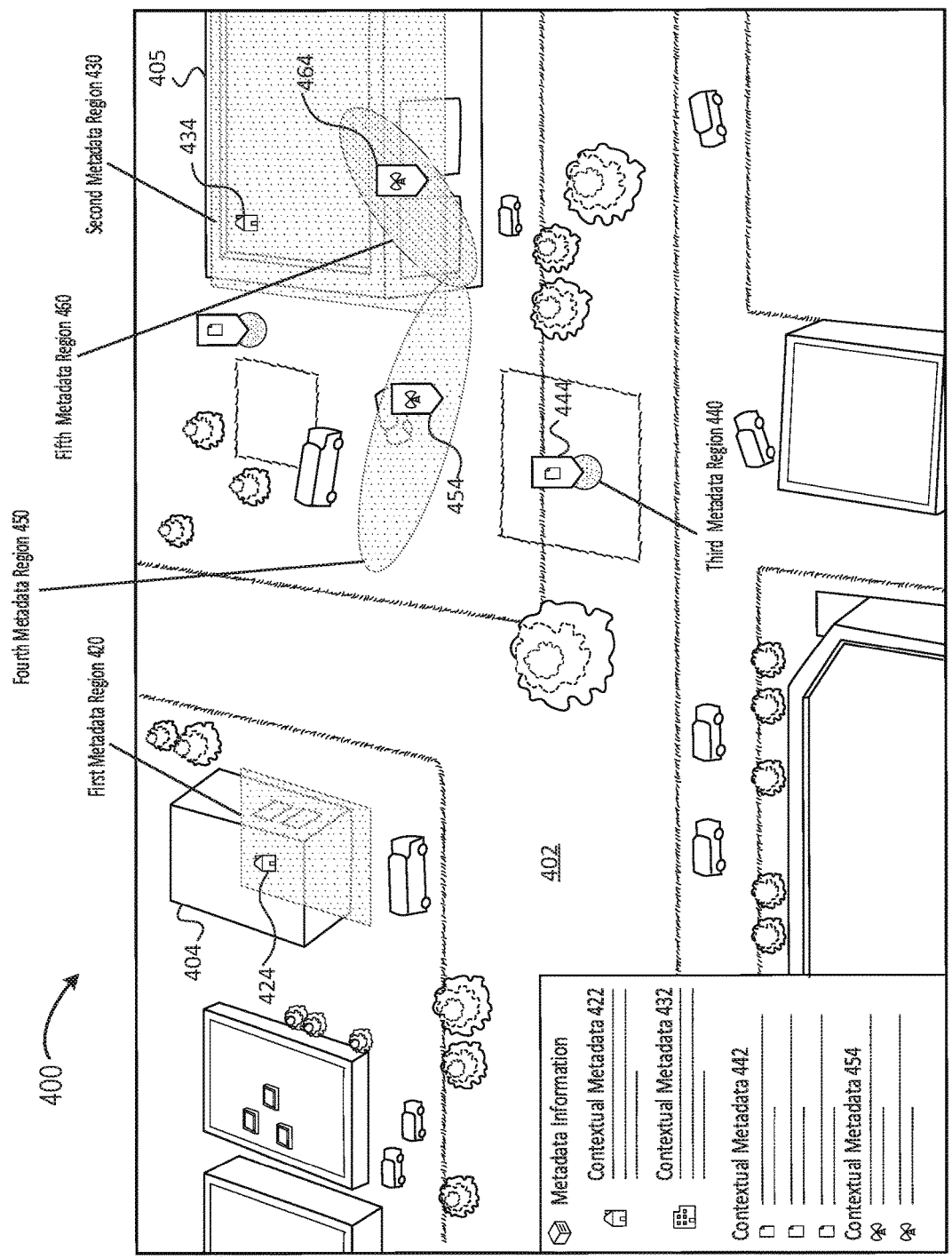
FIG. 4 depicts an example graphical user interface (GUI) according to some embodiments.

The presentation engine 210 may function to generate GUIs for displaying, and/or otherwise presenting, content. In some embodiments, the presentation engine 210 may cooperate with a client system to present content on a GUI displaying augmented reality content 224 for a portion of a geographic area. An example of such a GUI is shown in FIG. 4.

The content selection engine 212 may function to select content from one or more sources. Sources may include drones, data storage systems, and/or the like. The content selection engine 208 may automatically and/or manually select content. For example, a user may view a graphical representation of a geographic map of a geographic area. The user may select (e.g., zoom in) on a portion of the geographic map, and be presented with one or more live and/or pre-recorded content streams associated with that geographic area. For example, the content selection engine 208 may trigger the query engine 204 to search for historical information associated with the selected portion of the geographic map, and/or search for drones within a threshold vicinity of the selected portion of the geographic map. The user may select a particular content stream to view, and the content stream may be presented with overlaid contextual metadata.

The communication engine 214 may function to send requests, transmit and, receive communications, and/or otherwise provide communication with one or a plurality of systems. In some embodiments, the communication engine 214 functions to encrypt and decrypt communications. The communication engine 214 may function to send requests to and receive data from one or more systems through a network or a portion of a network. Depending upon implementation-specific considerations, the communication engine 214 may send requests and receive data through a connection, all or a portion of which may be a wireless connection. The communication engine 214 may request and receive messages, and/or other communications from associated systems. Communications may be stored in the augmented reality processing system datastore 218.

The augmented reality processing system datastore 216 may comprise one or more cloud-based datastores and/or local datastores for persistent and/or temporary storage. Accordingly, in various embodiments, information described herein may be stored in a single data store or multiple datastores. In various embodiments, the datastore 216, and/or other datastores described here, may have physical and/or virtual partitions.

Figure 3A:
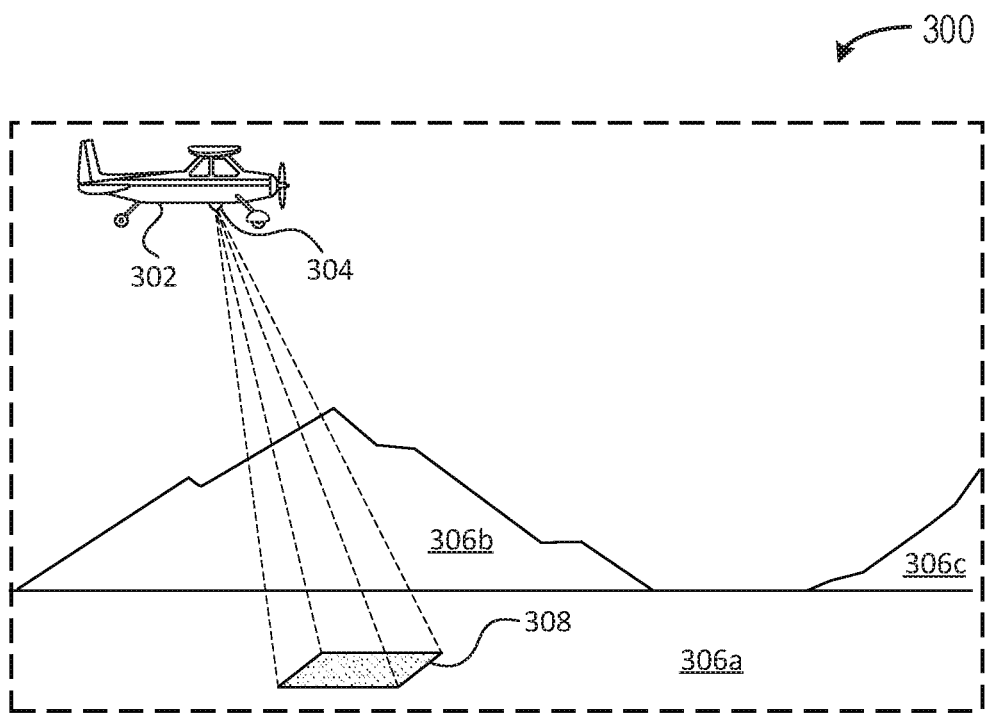
FIGS. 3A-B depict diagrams of an example of a content capture system capturing content of a geographic area according to some embodiments.
Figure 3B:
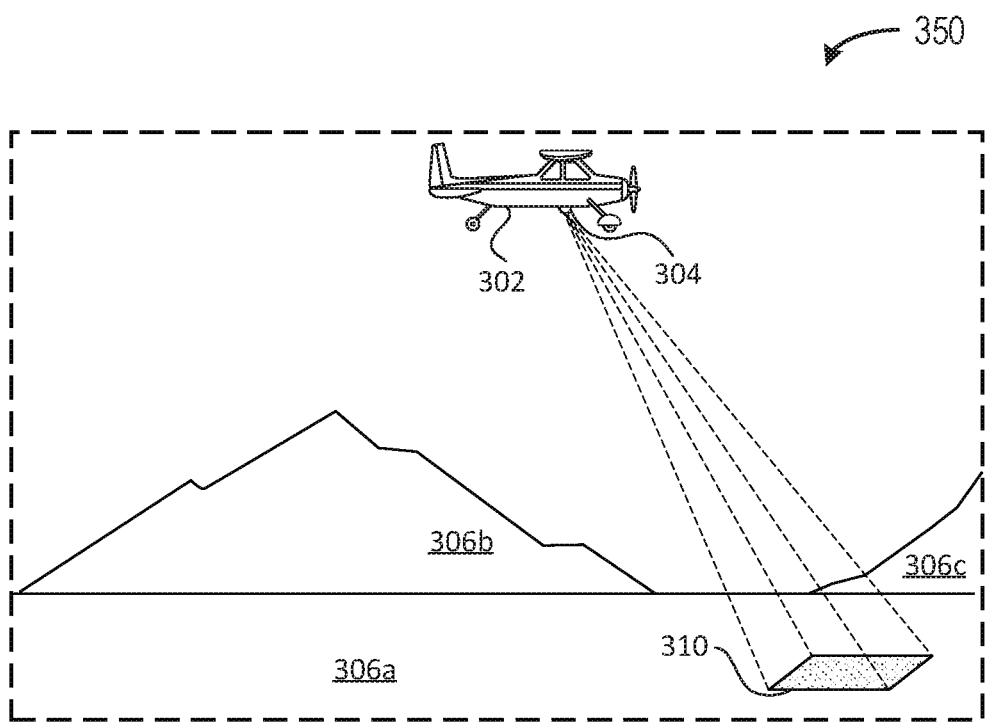

FIGS. 3A-B depict diagrams 300 and 350 of an example of a content capture system (e.g., content capture system 102) capturing content of a geographic area 306a according to some embodiments. In the example of FIG. 3A, the diagram 300 includes a drone 302, a content capture device 304, terrain 306, and a field-of-view (FOV) 308 of the content capture device 304 at a particular time. The geographic area 306a includes terrain features 306a and 306b, and may also include one or more other objects. The content capture system may comprise the drone 302 and/or the content capture device 304. As the drone 302 moves (e.g., flies or glides), raw content may be captured within the FOV 308 and subsequent FOVs (e.g., FOV 310, as shown in FIG. 3B). In some embodiments, the angle and/or aperture of the content capture device 304, a height/distance/elevation of the content capture device 304 and/or drone 302, and/or other parameters may be used to determine the FOVs 308 and 310 and/or geographic coordinates of the FOVs 308 and 310.

FIG. 4 depicts an example graphical user interface (GUI) 400 according to some embodiments. In the example of FIG. 4, the GUI 400 presents augmented reality content 402. The augmented reality content 402 may include raw content (e.g., video stream received from a drone) with overlaid contextual metadata. As shown, a first metadata region 420 is associated with a building structure object 404, and a second metadata region 430 is associated with a second building structure object 405. The corresponding contextual metadata 422 and 432 may be presented within the augmented reality content 402 and/or GUI 400. For example, the contextual metadata 422 and 432 may be presented within the corresponding metadata regions 422 and/or 432, and/or on another portion of the augmented reality content 402 and/or GUI 400 (e.g., a side portion of the GUI 400).

In some embodiments, metadata regions may be associated with one or more "activities" instead of, or in addition to, objects. Activities may include signal activity (e.g., cellar signals, radio signals, WiFi signals, and/or the like), message traffic (e.g., electronic messages, non-electronic messages), and/or the like. As shown in FIG. 4, a third metadata region 440 is associated with message traffic, and fourth and fifth metadata regions 450 and 460 are associated with signal activity. Graphical icons may be used to identify a type of contextual metadata and/or metadata region. For example, as shown, icons 424 and 434 indicate an association with an object, icon 444 indicates an association with message traffic, and icons 454 and 464 indicate an association with signal activity.

In some embodiments, the augmented reality content 402 may include a plurality of layers. One or more layers may comprise raw content, and one or more other layers may comprise contextual metadata. The contextual metadata layer(s) may be overlaid on the raw content layer(s) and/or other contextual metadata layers(s). For example, the contextual metadata layers may correspond to metadata regions. In various embodiments, the contextual metadata layers may be added in real-time (e.g., as the raw content is being captured and/or being displayed).

Figure 5:
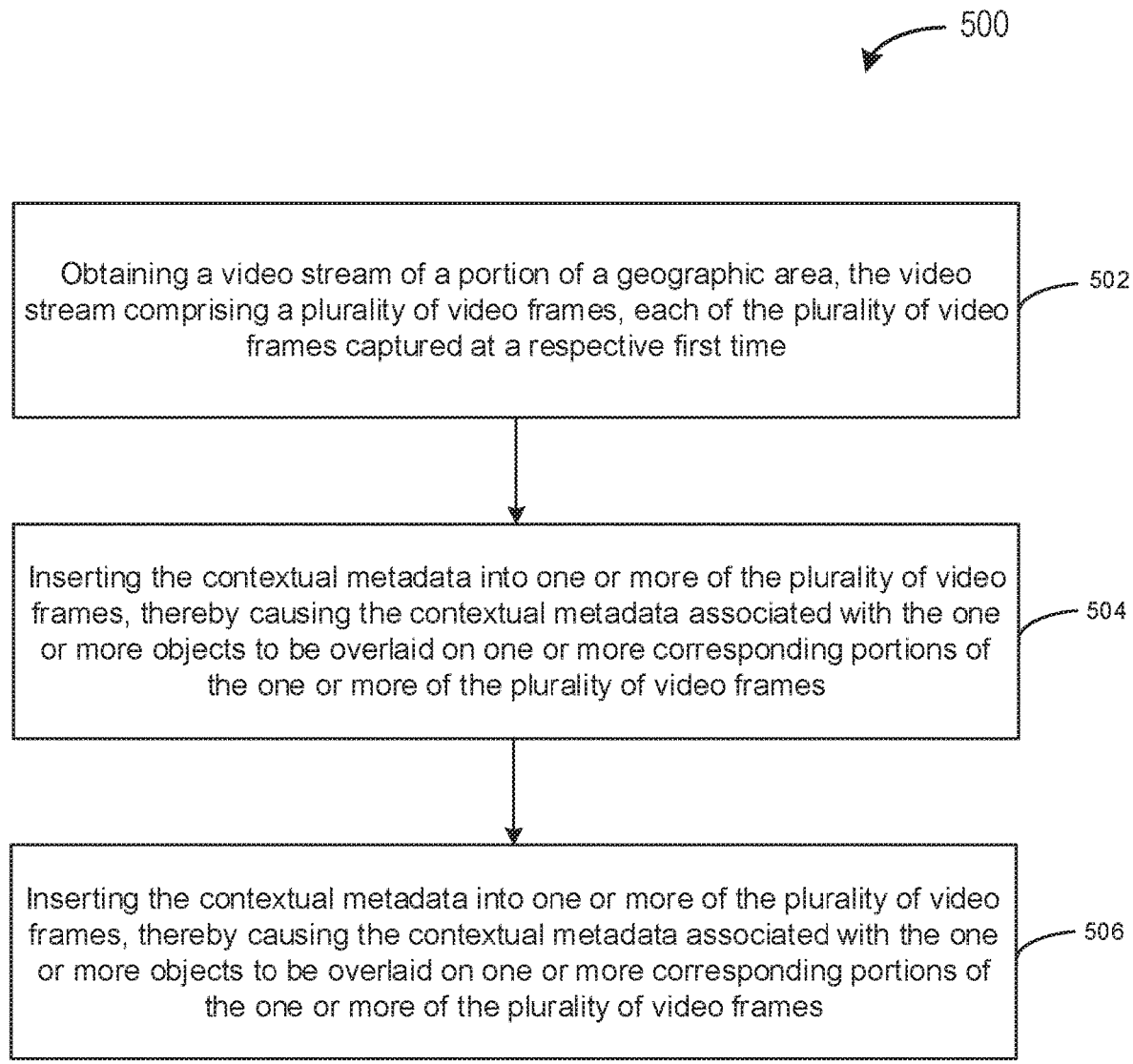
FIG. 5 depicts a flowchart of an example of a method of generating augmented reality content according to some embodiments.

FIG. 5 depicts a flowchart 500 of an example of a method of generating augmented reality content (e.g., augmented reality content 224) according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed but may have been included for the sake of illustrative clarity.

In step 502, an augmented reality processing system (e.g., augmented reality processing system 106) obtains a video stream (e.g., raw content 222 and/or other content) of a portion of a geographic area (e.g., geographic area 306). The video stream may be obtained from one or more sources. For example, the one or sources may include one or more drones (e.g., drone 302), historical information storage systems (e.g., historical information storage system 104), and/or the like. The portion of the geographic area may include one or more objects (e.g., building structure objects 404 and 405). The video stream may comprise a plurality of video frames, and each of the plurality of video frames may have been captured at a respective first time (e.g., 05:30:01 AM on Jan. 1, 2018, 05:30:02 AM on Jan. 1, 2018). The video stream may be obtained in real-time (e.g., from an associated drone) and/or otherwise (e.g., recorded video in a remote datastore). In some embodiments, a content receiver engine (e.g., content receiver engine 202) and/or a communication engine (e.g., communication engine 214) obtains the video stream.

In step 504, the augmented reality processing system obtains contextual metadata (e.g., contextual metadata 226). For example, the contextual metadata may comprise historical information (e.g., historical information 220) obtained from a remote datastore (e.g., historical information storage system 104) over a communication network. The contextual metadata may be associated with one or more objects located in the portion of the geographic area at a second time (e.g., 14:45:05 on Dec. 20, 2017) before each of the respective first times. In some embodiments, an augmented reality metadata engine (e.g., augmented reality metadata engine 206) obtains the contextual metadata.

In step 506, the augmented reality processing system inserts the contextual metadata into one or more of the plurality of video frames, thereby causing the contextual metadata associated with the one or more objects to be overlaid on one or more corresponding portions of the one or more of the plurality of video frames. For example, a name and/or other information of a building structure may be overlaid on the building structure in the video frame. This may help provide users with contextual information while a user views the video, and/or help users identify features in the video that would otherwise not be identifiable (e e.g., due to cloud cover, blurry images, low resolution images). In some embodiments, the augmented reality metadata engine inserts the contextual metadata and/or otherwise causes the contextual metadata to be overlaid on one or more corresponding portions of the one or more of the plurality of video frames.

In some embodiments, the contextual metadata is inserted into the one or more of the plurality of video frames in response to a user viewing the one or more of the plurality of video frames. For example, a user may select a video stream to view, and at that time, the contextual metadata may be inserted. More specifically, a user may be viewing a graphical map displayed by a GUI (e.g., GUI 400), select and/or zoom in a portion of the graphical map, and be provided with the one or more feeds. The user may select a particular feed, and the contextual metadata may be inserted into the video frames.

Figure 6:
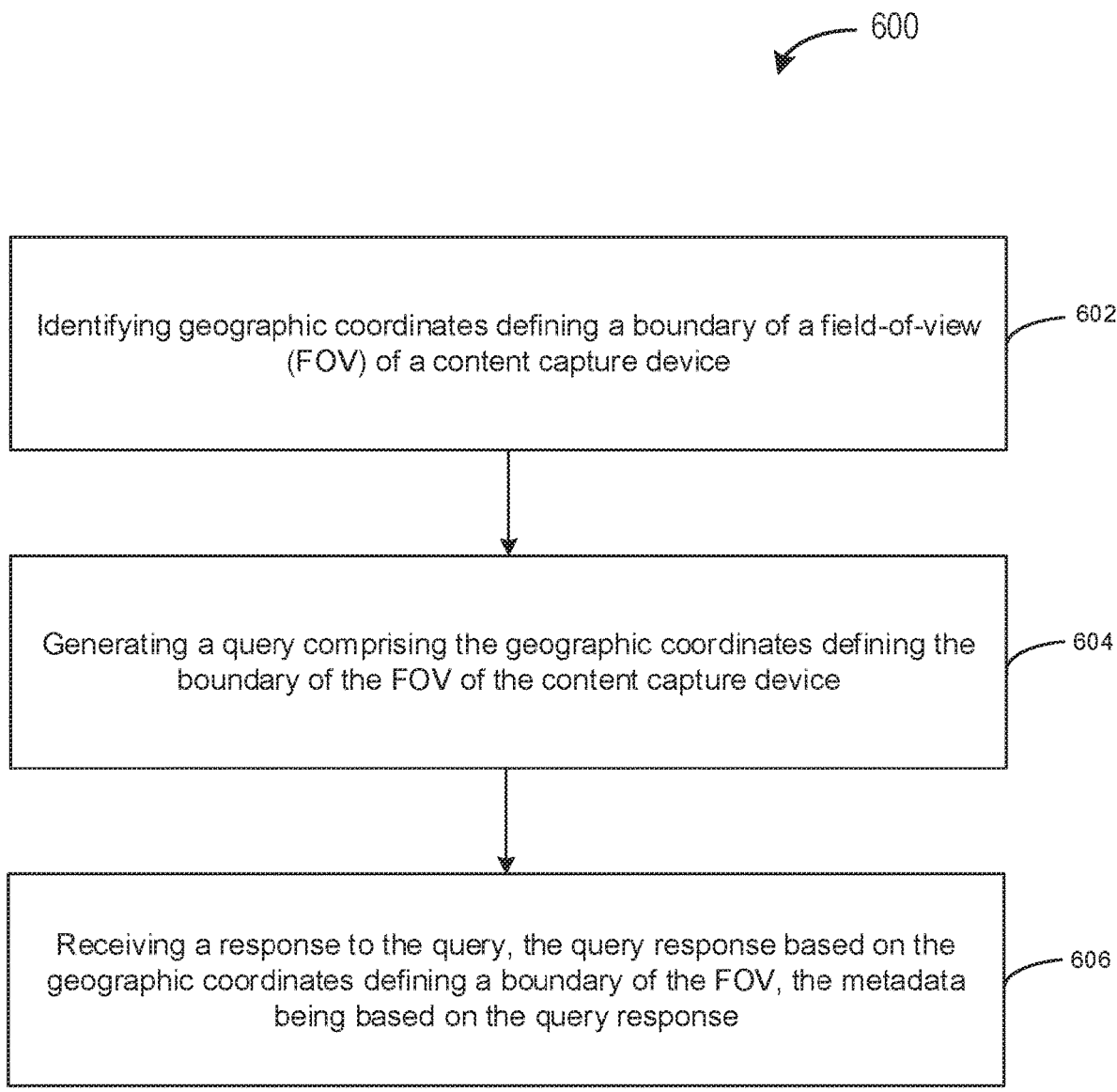
FIG. 6 depicts a flowchart of an example of a method of obtaining contextual metadata according to some embodiments.

FIG. 6 depicts a flowchart 600 of an example of a method of obtaining contextual metadata (e.g., contextual metadata 226) according to some embodiments.

In step 602, an augmented reality processing system (e.g., augmented reality processing system 106) identifies geographic coordinates defining a boundary of the field-of-view (FOV) of a camera (e.g., content capture device 304) associated with a video stream (e.g., raw content 222). In some embodiments, a query engine (e.g., query engine 204) and/or an augmented reality metadata engine (e.g., augmented reality metadata engine 206) identifies the geographic coordinates.

In step 604, the augmented reality processing system generates a search query comprising the geographic coordinates defining a boundary of the FOV of the camera associated with the video stream. In some embodiments, the query engine generates the search query. In some embodiments, the query further includes one or more respective first times, and the query response is based on the one or more of the respective first times. For example, the query may only retrieve information within a threshold amount of time before the first time (e.g., one month), so that information is current and/or not stale.

In step 606, the augmented reality processing system receives a response to the query. The query response may be based on the geographic coordinates defining the boundary of the FOV, and the contextual metadata may be based on the query response. For example, the query response may include the contextual metadata itself, and/or the contextual metadata may be based on information included in the response (e.g., generated from the information included in the response). In some embodiments, the augmented reality metadata engine and/or a communication engine (e.g., communication engine 214) receives the query response.

Figure 7:
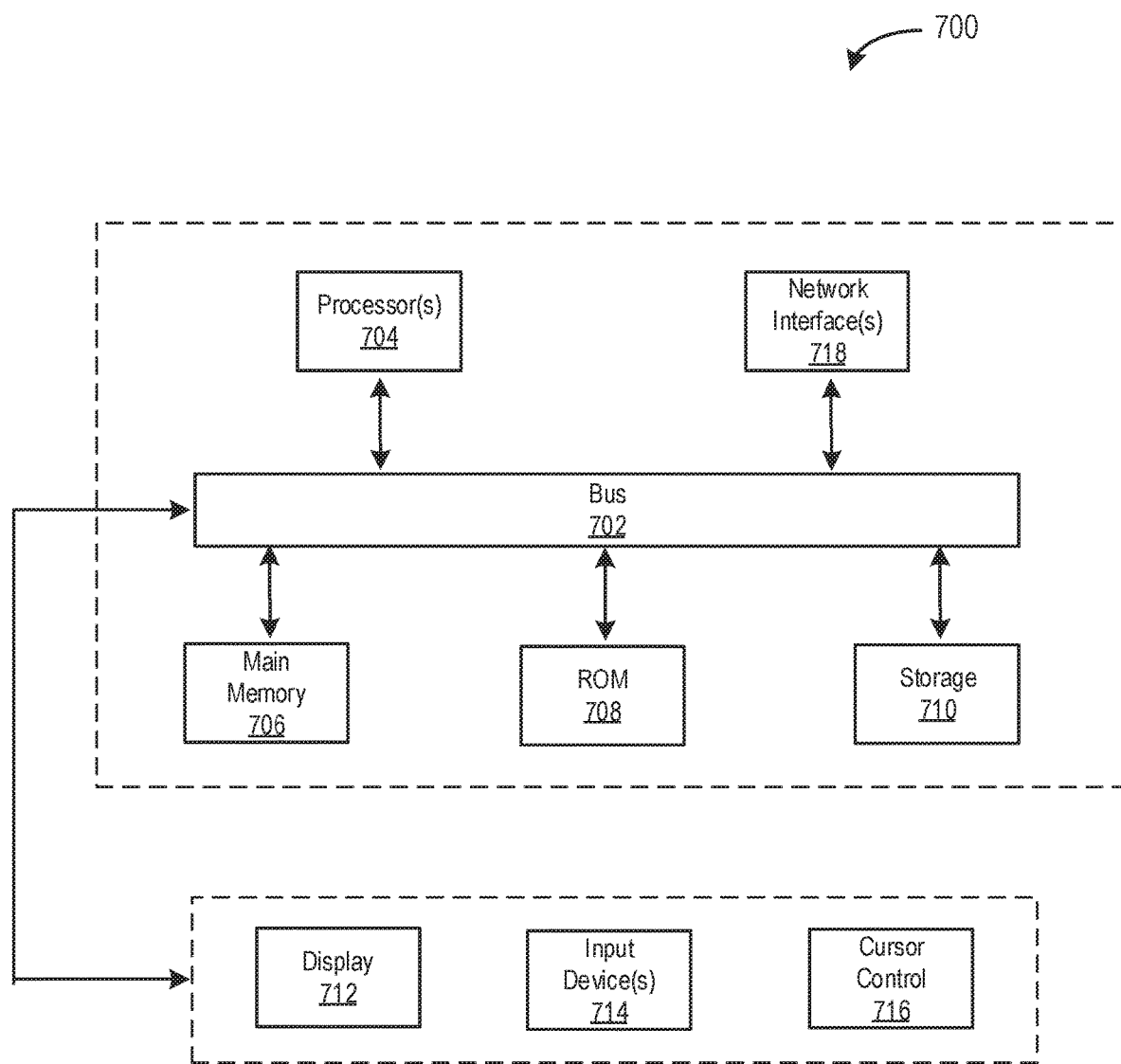
FIG. 7 depicts a block diagram of an example of a computer system according to some embodiments.

FIG. 7 depicts a block diagram of an example of a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
   one or more processors; and
   memory storing instructions that, when executed by the one or more processors, cause the system to perform:
   acquiring a selection of a portion of a geographic area;
   obtaining geographic coordinates corresponding to the portion;
   searching for a video content stream associated with the portion from a drone within a threshold vicinity of the selected portion;
   selecting the video content stream;
   obtaining the video content stream generated by the drone, the video content stream comprising video frames, each of the video frames captured at respective first times and having respective fields of view (FOVs);
   obtaining contextual metadata comprising layers, wherein each layer of the layers comprises:
      a pre-recorded video content stream associated with one or more objects or activities located within perimeter borders of the respective FOVs at a second time, the second time being before each of the respective first times;
   receiving a user selection of a particular video frame in the video content stream; and
   in response to the user selection of the particular video frame, overlaying the layers comprising the pre-recorded video content stream onto an obscured feature in the particular video frame.

2. The system of claim 1, wherein the one or more objects comprise one or more building structures, and the contextual metadata comprises information associated with the one or more building structures.

3. The system of claim 1, wherein the video stream comprises a live video stream.

4. The system of claim 1, wherein the video stream is obtained in response to a user zooming in on a geographic map representing at least the portion of the geographic area.

5. The system of claim 4, wherein the video stream is overlaid on a portion of the geographic map.

6. The system of claim 1, wherein the instructions further cause the system to perform:
   obtaining geographic coordinates corresponding to the FOVs responsive to a query; and
   receiving a response to the query, the response comprising information related to the perimeter borders of each of the updated FOVs.

7. The system of claim 1, wherein each layer of the layers comprises a different category of objects or activities compared to other layers.

8. The system of claim 1, wherein a first layer of the layers comprises a physical structure, a second layer of the layers comprises electronic signal activity, and a third layer of the layers comprises message activity.

9. The system of claim 1, wherein the overlaying of the layers comprises triggering the particular video frame and video content in each of the layers to be automatically played back simultaneously, wherein, prior to the selection of the particular video frame, each of the layers and the particular video frame are individually separated.

10. A method being implemented by a computing system including one or more physical processors and storage media storing machine-readable instructions, the method comprising:
   acquiring a selection of a portion of a geographic area;
   obtaining geographic coordinates corresponding to the portion;
   searching for a video content stream associated with the portion from a drone within a threshold vicinity of the selected portion;
   selecting the video content stream;
   obtaining the video content stream generated by the drone, the video content stream comprising video frames, each of the video frames captured at respective first times and having respective fields of view (FOVs);

obtaining contextual metadata comprising layers, wherein each layer of the layers comprises:

a pre-recorded video content stream associated with one or more objects or activities located within perimeter borders of the respective FOVs at a second time, the second time being before each of the respective first times;

receiving a user selection of a particular video frame in the video content stream; and in response to the user selection of the particular video frame, overlaying the layers comprising the pre-recorded video content stream onto an obscured feature in the particular video frame.

11. The method of claim 10, wherein the one or more objects comprise one or more building structures, and the contextual metadata comprises information associated with the one or more building structures.

12. The method of claim 10, wherein the video stream comprises a live video stream.

13. The method of claim 10, wherein the video stream is obtained in response to a user zooming in on a geographic map representing at least the portion of the geographic area.

14. The method of claim 13, wherein the video stream is overlaid on a portion of the geographic map.

15. The method of claim 10, further comprising:

obtaining geographic coordinates corresponding to the respective FOVs in responsive to a query; and receiving a response to the query, the response comprising information related to the perimeter borders of each of the updated FOVs.

16. A non-transitory computer readable medium comprising instructions that, when executed, cause one or more processors to perform:

acquiring a selection of a portion of a geographic area;

obtaining geographic coordinates corresponding to the portion;

searching for a video content stream associated with the portion from a drone within a threshold vicinity of the selected portion;

selecting the video content stream;

obtaining the video content stream generated by the drone, the video content stream comprising video frames, each of the video frames captured at respective first times and having respective fields of view (FOVs);

obtaining contextual metadata comprising layers, wherein each layer of the layers comprises:

a pre-recorded video content stream associated with one or more objects or activities located within perimeter borders of the respective FOVs at a second time, the second time being before each of the respective first times;

receiving a user selection of a particular video frame in the video content stream; and in response to the user selection of the particular video frame, overlaying the layers comprising the pre-recorded video content stream onto an obscured feature in the particular video frame.

17. The system of claim 1, wherein the contextual metadata comprises a threat level of a building structure.

18. The system of claim 1, wherein augmented reality content is generated in part by the contextual metadata overlaid onto one or more of the corresponding video frames; and playback of the augmented reality content renders the video stream and an additional layer comprising second contextual metadata.

* * * * *